United States Patent [19]

Verma et al.

[11] Patent Number: 4,467,710

[45] Date of Patent: Aug. 28, 1984

[54] APPARATUS FOR CRACKING EDIBLE NUTS

[75] Inventors: Brahm P. Verma; Stanley E. Prussia, both of Griffin, Ga.

[73] Assignee: University of Georgia Research Foundation, Inc., Athens, Ga.

[21] Appl. No.: 330,663

[22] Filed: Dec. 14, 1981

[51] Int. Cl.³ ............................................. A23N 5/00
[52] U.S. Cl. ........................................ 99/571; 99/582
[58] Field of Search .......... 99/568, 571, 572, 579–583, 99/609, 629, 518, 519; 30/120.1, 120.2; 426/481, 482; 241/5

[56] References Cited

U.S. PATENT DOCUMENTS

| | | | |
|---|---|---|---|
| 2,512,107 | 6/1950 | Lenhart et al. | 99/571 |
| 3,301,290 | 1/1967 | Scalella et al. | 99/571 X |
| 3,524,486 | 8/1970 | Turner | 99/571 X |
| 3,621,898 | 11/1971 | Turner | 99/571 |
| 3,841,212 | 10/1974 | Powell | 99/571 |
| 3,858,501 | 1/1975 | Pfeiffer | 99/582 X |

FOREIGN PATENT DOCUMENTS 2446101  8/1980  France ................................ 99/571

Primary Examiner—Timothy F. Simone
Attorney, Agent, or Firm—Oblon, Fisher, Spivak, McClelland & Maier

[57] ABSTRACT

A method and apparatus for cracking and removing the shells from nuts is disclosed. The nuts are held between the conical end surface of a tail stock and the end of a hollow barrel. A free moving billet, having a concave, conical end surface, is positioned within the barrel at the end opposite the nut. The billet is accelerated so as to strike the nut and shatter the shell with minimum deformation thereof.

11 Claims, 4 Drawing Figures

APPARATUS FOR CRACKING EDIBLE NUTS

BACKGROUND OF THE INVENTION

1. Field of the Invention

The present invention is concerned with the cracking and removal of shells from edible nuts. More particularly, the present invention concerns a method and apparatus for removing shells from edible nuts by impacting the shells with a free travelling high speed billet.

2. Description of the Prior Art

It has been known to use mechanical means for the cracking and removing the shells from nuts. In order to recover undamaged kernels, the nuts are usually first conditioned by moisturizing so as to make the kernel more pliable. Rupture of the nut shell material occurs when deformation of the shell causes stresses exceeding the ultimate strength of the shell material. The prior art shell cracking devices operated on the principal of introducing a constant deformation to the shell at relatively low speeds. According to these devices, the shell is fractured by compressing the nuts from the ends thereof. The nuts are then subjected to a severe shelling operation in which the shell fractures created by the compression are enlarged for removing the shells from the kernels.

However, these prior art devices suffered from several shortcomings. First, the shellers were mechanically agressive machines that successfully separated the kernel and shell at the expense of considerable breakage of the kernel. Moreover, the shells broke into relatively large pieces that required severe shelling to separate adhering kernels. Due to the incomplete cracking and subsequent sheller damage, extensive equipment and labor inputs were required to separate the kernel pieces from similar size shell material. In contrast, an ideal cracking machine should break the shell into small pieces without damaging the kernel so that a gentle operation separates the kernel from the shell.

Second, the prior art nut crackers operating on the principal of fixed deformation did not cause a constant nut deformation, due to variations in nut length resulting from the common practice of sizing nuts by shell diameter, rather than length.

Third, deformations of the nuts sufficient to crack the shell damaged the nut kernel as well. In unstressed nuts, a certain small space exists between the shell and the nut kernel. However, before reaching its yield point, the shell typically undergoes deformations greater than the length of this space such that the interior of the shell contacts the nut kernel. Moreover, this deformation is typically so great that the kernel itself is deformed to an extent greater than the bioyield point thereof. Thus, by the use of constant deformation of the nut at relatively low speeds for cracking the shell, the kernel is also damaged before the cracking of the shell occurs. Commercial crackers, such as the "Meyer Automatic Edible Nut Cracker" have attempted to overcome this problem by providing adjustable stops to limit the maximum amount of deformation, however this has not proven to be entirely satisfactory.

It has also been known that impulsive forces applied to structures will cause rupture of the structures with relatively small overall deformation (Marin and Sauer; 1964; "Members Subjected To Impact Loads"; page 396; In Strength Of Materials, second edition, the Mac-Millan Co., New York). However, no prior attempt had been made to apply the principels of application of impulsive forces to the problems of cracking nut shells.

SUMMARY OF THE INVENTION

It is the object of the present invention to provide a method and apparatus for cracking nut shells without damaging the kernel, by impacting the kernel with a freely travelling billet.

Applicants have hypothesized that suddenly applied loads on a shell will cause shattering of the shell with relatively small deformations, the reduced shell deformations being benefical because of the relatively small space existing between the interior of the shell and the kernel. Applicants have hypothesized that an impulsive force acting upon the shell will propagate shock waves through the shell that may shatter it into many small pieces before the maximum permissible deformation of the shell is achieved.

Accordingly, applicants have developed a method and apparatus for cracking and removing the shells of nuts by impacting the shells with a load in the form of a billet which is moving free of external forces just prior to impact. The nut is held by placing it between a rigid barrel and a movable block. A cone shaped concave surface on the end of the block centers the shell as the shell and block are pushed towards the barrel. The block is locked in place when the nut has securely seated against the barrel opening. Thus, the shell is supported at points around a narrow circumferential band near each end. Cracking efficiency is thus independent of shell length and diameter within certain limits of barrel diameter and cone taper angle. A billet is positioned within the barrel at the end opposite the nut. The billet is preferably made of a metallic material and has a concave cone shaped end facing the nut. Mechanical, electrical, pneumatic or other similar means are used to accelerate the billet in a free travelling manner along a portion of the barrel. Upon striking the nut, the kenetic energy of the billet is converted into a shell shattering impulsive collision with the nut resulting in the shattering of the nut into many small pieces. It has been found that the number of shell fragments increases as the velocity of the billet is increased. This is believed to be due to increased brittleness in shell material when the duration of the impulse is reduced. The higher velocities require a lighter billet to prevent crushing of the kernel and billet mass and velocity are adjusted to provide the best combination for cracking edible nuts under varying conditions with minimum damage to the kernel.

It is also possible to provide a secondary impact upon the nut. The secondary impact could be caused by a movable plunger in the center of the billet. It is also possible to provide double ended impact which might help the consistency of the shattering over the full length of the shell. This could be provided by replacing the movable block with a second barrel. It would also be possible to provide automation by using multiple crackers mounted on a rotating disk.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
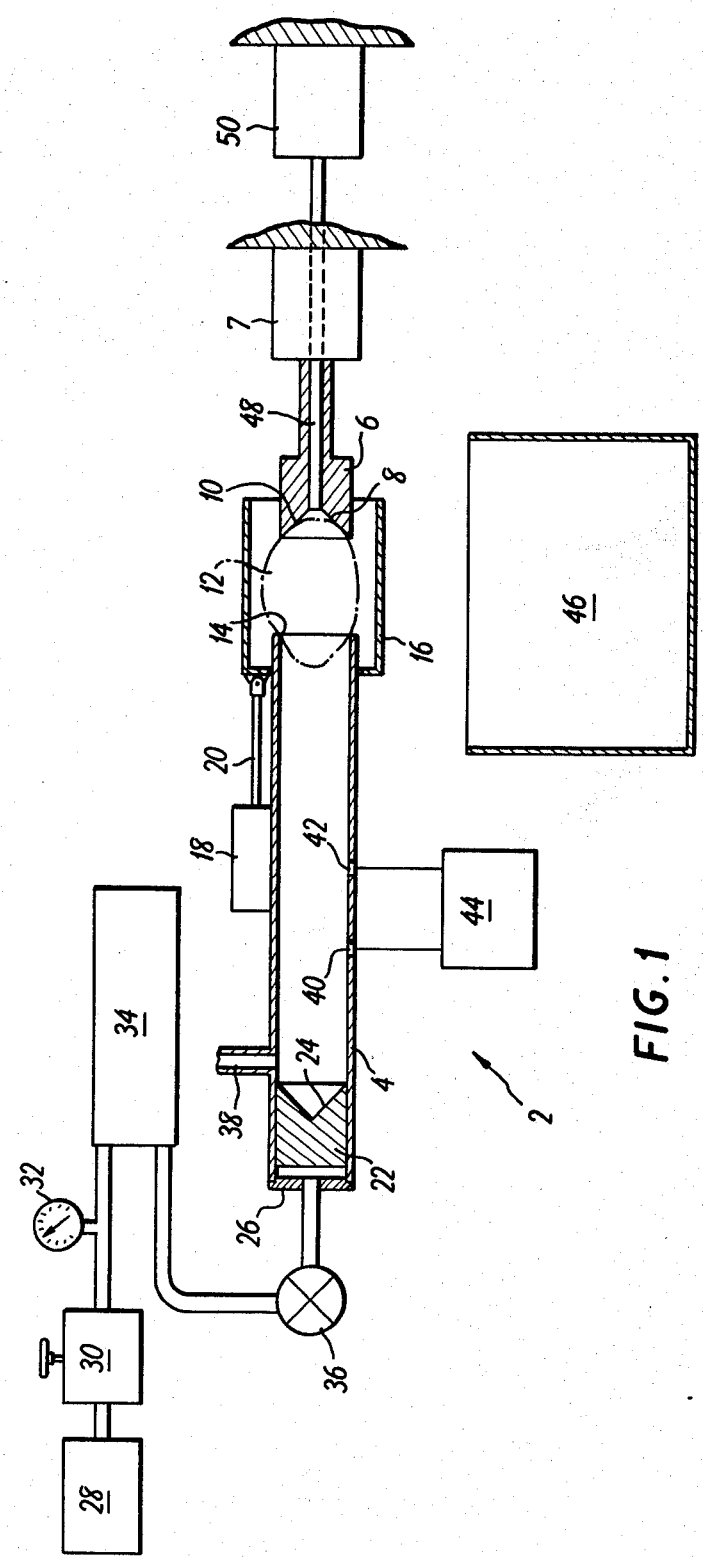
FIG. 1 is a view, partially schematic, of the nut cracker according to the preferred embodiment of the present invention.

One embodiment of the nut cracker of the present invention is designated generally as 2 in FIG. 1. A barrel 4, which may be cylindrical in cross-section, but could also be of any other desired cross-sectional configuration, is positioned in coaxial opposition to a tail stock 6. In the embodiment of FIG. 1, the tail stock is mounted upon a solenoid 7 for movement towards or away from the barrel 4. Mechanical or fluid means could be used in place of the solenoid for the purpose of moving the tail stock. Similarly, the barrel itself could be moved while the tail stock is held stationary. The end 8 of the tail stock has a concave, conical shape so that it contacts a nut 12 placed against the end of the tail stock along a narrow circumferential band 10 spaced from the end of the nut. Similarly, the end of the barrel 4 contacts the nut at a narrow circumferential band 14 spaced from the other end of the nut.

A movable guard is provided for surrounding the nut during cracking. In the embodiment of FIG. 1, the guard is in the form of a cylindrical sleeve 16 having a larger diameter than the barrel 4 and the nut. The sleeve is slidable over the barrel with the aid of any appropriate bearing means and may be driven between a position in which the sleeve covers the nut and a position in which the sleeve is withdrawn back over the barrel, by appropriate means such as the solenoid 18 mounted on the barrel 4 and including a rod 20 connected to the sleeve.

The billet 22 can be formed from steel or, if a lighter weight is desired, from aluminum, either solid or hollow. The billet has the same cross-sectional shape as the barrel and is of slightly smaller diameter than the interior of the barrel so that the billet can freely slide along the axis of the barrel. The end 24 of the billet facing the tail stock also has a concave, conical shape for striking the nut around a narrow circumferential band spaced from the end thereof. The specific mass and velocity chosen for the billet varies with the nut cracking conditions. However, as a general rule, it has been found that the degree of nut cracking performance improves as the mass of the billet decreases. In particular, lower mass billets derive more benefit from nut moisturization pretreatment, and permit a large range of billet velocities for optimal performance, than do more massive billets. Nut cracking performance also increases with increased billet velocity up to a certain value beyond which additional velocity causes excessive kernel damage. The mass of the billet may thus be matched with the optimum billet velocity to provide sufficient kinetic energy for cracking. For example, in the cracking of pecans it has been found that a billet having a mass of 6.88 grams travelling at 22 meters per second gave the best results.

The billets can be driven in any desired manner so long as it is freely moving at the moment of impact with the nut. The billet can be accelerated by any mechanical, electrical or fluid pressure means. According to the preferred embodiment, acceleration is provided by compressed air released between the billet and the end 26 of the barrel 4. The compressed air is provided from a source of compressed air 28 via a regulator 30, a guage 32, and accumulator 34 which provides stable air pressure under dynamic conditions and a pilot operated valve 36. An exhaust port 38 on the barrel vents the compressed air after the billet has been accelerated to the desired velocity. Thus, the billet velocity remains constant until it strikes the nut.

The velocity of the billet may be measured by a pair of reflective type PIN photodiodes 40 and 42 positioned on the interior surface of the barrel at a point downstream from the vent 38. The diodes are connected to a digital timer 44 which measures the billet velocity based upon the readings from the photodiodes.

A container 46 collects the kernels and cracked shell pieces.

The billet may be returned to the firing position by any desired method including the use of plungers, springs, tabs, electromagnetic means and gravity. In the embodiment of FIG. 1, a plunger 48 coaxial with the tail stock may be separately moved, as by a separate solenoid 50 for returning the billet to the initial firing position.

In the preferred embodiment, the inner diameter of the barrel 14 is 16 millimeters, the length of the barrel is 22.5 centimeters, the vent 38 is positioned 7.5 centimeters from the end 26 of the barrel and the photodiodes are positioned 7.62 centimeters apart.

In use, a nut 12 is positioned between the end 14 of the barrel and the end 8 of the tail stock. The tail stock is subsequently moved towards the barrel until the nut is securely seated between the barrel opening and the tail stock. The nut may optionally be pretreated by soaking in water. The sleeve 16 is then slid over the nut by the solenoid 18. The valve 36 is then opened so that the billet is subjected to compressed air provided through the regulator 30 and accumulator 34. The compressed air drives the billet to a desired velocity, depending upon the precise air pressure chosen, and the compresed air is vented at 38. Repeatable billet velocity at predetermined air pressure can be adjusted for by use of the regulator and pressure guage to change the accumulator pressure. The free travelling billet strikes the nut 12 which shatters because of its limited support in two narrow circumferential bands. The sleeve 16 may then be retracted so that the shell pieces and kernels fall into the container 46 for further processing. The billet is then returned to its starting position by the rod 48.

Figure 2:
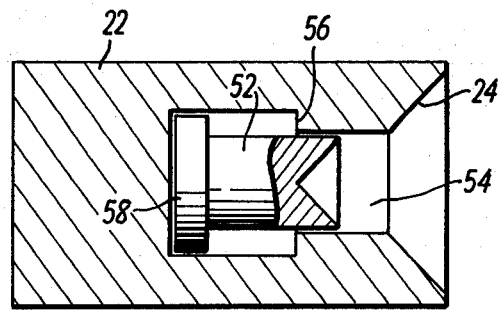
FIG. 2 is a detail view of a variation of the billet according to the present invention.

A variation is shown in FIG. 2 wherein the billet 22 includes a plunger 52 for providing a secondary impact upon the nut. According to this embodiment, the billet includes a central bore 54 extending from the surface 24 thereof. The bore has an internal enlargement defined by shoulder 56. The plunger 52 includes a flange 58 having a diameter greater than that of the bore 54 but less than that of the shoulder 56. The plunger is therefore able to move relative to the billet along the direction of the barrel axis. When the billet is first accelerated, the inertia of the plunger moves it back towards the position shown in the Figure. However, upon the billet striking the nut, the inertia of the plunger causes it to move forward and strike the nut with a secondary impact, the movement of the plunger being limited by the contact between the shoulder 56 and the flange 58. The resulting secondary impact will improve the cracking effect of the shell material in contact with the billet cone.

Figure 3:
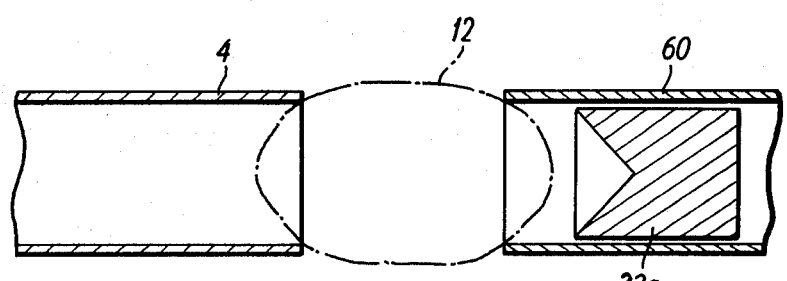
FIG. 3 is a detail showing a second embodiment wherein the nut is struck by billets at both ends.

FIG. 3 schematically shows a portion of a further embodiment in which the tail stock 4 is replaced by a second barrel 60 having a second billet 22a. The second barrel 60 is movable for locking the nut between the ends of the barrel. Double ended impact might help the consistency of shattering over the full length of the shell.

Figure 4:
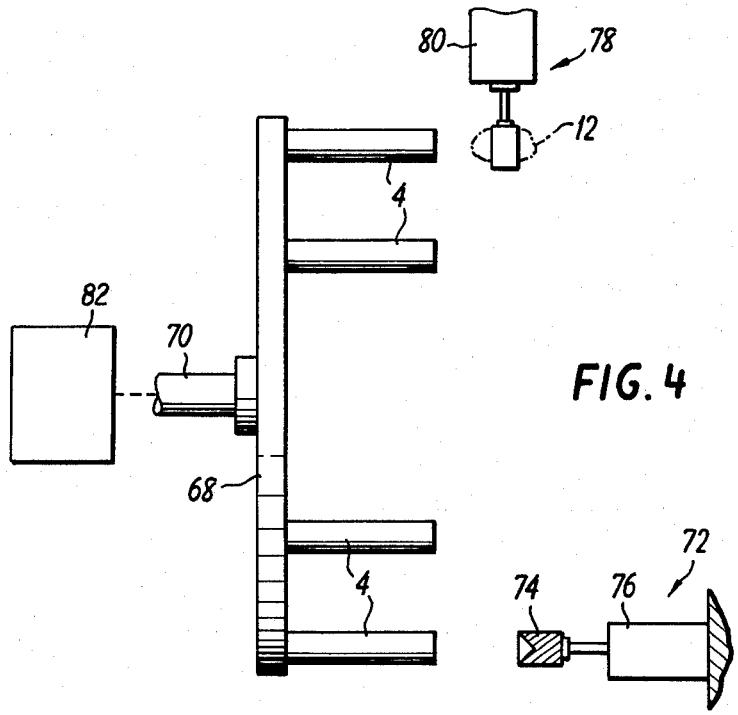
FIG. 4 is a schematic illustration of an automated nut cracker apparatus.

The nut cracking apparatus and method of the present invention are adaptable to automated procedures. For example, according to the embodiment schematically shown in FIG. 4, a number of barrels 4 can be positioned on the circumferential periphery of a disk 68 rotatably mounted on shaft 70 driven by an appropriate drive schematically indicated at 82. Station 72 at one circumferential position of the disk includes tail stock 74 and solenoid 76 for the nut cracking step while station 78 at another circumferential position of the rotating disk includes nut loading and removal means 80.

Accordingly, the method and apparatus of the present invention provide cracking and separation of untreated pecans. Impacting the pecans with a free moving billet of relatively light mass and high velocity cracks and removes shells to the extent that only gentle subsequent shelling is required for retrieving undamaged kernals. Moreover, the quality of cracking may be improved by treating the nuts so as to increase the kernal moisture content.

Obviously, numerous modifications and variations of the present invention are possible in light of the above teachings. It is therfore to be understood that within the scope of the appended claims, the invention may be practiced otherwise than as specifically described herein.

What is claimed as new and desired to be secured by Letters Patent of the United States is:

1. A nut cracker comprising:
   a hollow barrel having two ends and a longitudinal axis;
   nut holder means coaxial with said barrel and spaced from one open end of said barrel;
   means for providing relative movement between said barrel and said nut holder means whereby a nut may be clamped between said nut holder means and said one end of said barrel;
   a lightweight freely moving billet movable within said barrel along the axis thereof and normally positioned at the other end of said barrel;
   means for accelerating said billet towards said one end of said barrel at high velocity, said means for accelerating permitting said billet to travel freely such that said billet is free of external forces acting in the direction towards said one end of said barrel when said billet reaches said one end of said barrel, whereby substantially only kinetic energy of said billet is used to crack said nut.

2. The nut cracker of claim 1 wherein said nut holder means includes an end facing said barrel, said end facing said barrel having a concave conical form, whereby a nut may be supported by said barrel and said nut holder means along narrow circumferential bands near each end.

3. The nut cracker of claims 1 or 2 including a movable guard surrounding the space between said barrel and said nut holder means.

4. The nut cracker of claims 1 or 2 including means associated with said barrel for measuring the velocity of said billet.

5. The nut cracker of claims 1 or 2 wherein said means for accelerating said billet comprise:
   a source of compressed gas;
   a pressure accumulator connected to said source;
   a valve connected to said accumulator; and
   conduit means connecting said valve to said other end of said barrel.

6. The nut cracker of claim 5 including a gas vent in said barrel at a point between said two ends.

7. The nut cracker of claims 1 or 2 wherein said billet has a first end facing said one end of said barrel and having the form of a concave cone in section.

8. The nut cracker of claim 7 wherein said billet includes:
   a longitudinal bore extending from said first end of said billet;
   a plunger axially movable in said bore; and
   means for limiting the movement of said plunger.

9. The nut cracker of claim 1 wherein said nut holder means comprises a second barrel having a second billet, whereby said nut may be impacted at both ends thereof.

10. The nut cracker of claim 1 including a plurality of said barrels, means for successively for moving each of said barrels into a nut cracking station and means for loading nuts onto each barrel.

11. The nut cracker of claims 1 or 2 including means for returning said billet to said other end of said barrel.

* * * * *